(12) United States Patent
Neugebauer et al.

(10) Patent No.: US 8,979,342 B2
(45) Date of Patent: Mar. 17, 2015

(54) PLANAR FRONT ILLUMINATION SYSTEM HAVING A LIGHT GUIDE WITH MICRO SCATTERING FEATURES FORMED THEREON AND METHOD OF MANUFACTURING THE SAME

(75) Inventors: Charles Neugebauer, Los Altos, CA (US); William Saperstein, San Carlos, CA (US)

(73) Assignee: barnesandnoble.com llc, New York, NY (US)

( * ) Notice: Subject to any disclaimer, the term of this patent is extended or adjusted under 35 U.S.C. 154(b) by 319 days.

(21) Appl. No.: 13/588,872

(22) Filed: Aug. 17, 2012

(65) Prior Publication Data
US 2013/0063968 A1 Mar. 14, 2013

Related U.S. Application Data

(60) Provisional application No. 61/525,667, filed on Aug. 19, 2011.

(51) Int. Cl.
*F21V 7/04* (2006.01)
*F21V 8/00* (2006.01)

(52) U.S. Cl.
CPC ............ *G02B 6/0043* (2013.01); *G02B 6/0036* (2013.01); *G02B 6/005* (2013.01)
USPC .............. 362/603; 349/63; 362/618; 362/627

(58) Field of Classification Search
CPC ..... G02B 6/0043; G02B 6/0036; G02B 6/005
USPC ............. 349/63; 362/603, 618, 624, 627, 629
See application file for complete search history.

(56) References Cited

U.S. PATENT DOCUMENTS

| 4,373,282 A | 2/1983 | Wragg ............................ 40/546 |
| 6,108,059 A | 8/2000 | Yang |

(Continued)

FOREIGN PATENT DOCUMENTS

| CN | 1454329 A | 11/2003 |
| CN | 1637517 A | 7/2005 |

(Continued)

OTHER PUBLICATIONS

English Translation of Office Action from ROC (Taiwan) Pat. Appln. No. 101130061 dated May 20, 2014.

*Primary Examiner* — Stephen F Husar
(74) *Attorney, Agent, or Firm* — Winston & Strawn LLP

(57) ABSTRACT

A system for illuminating a reflective display or other material from a planar front device and a method of manufacture thereof. The system includes a light guide plate that conducts light from an edge light source across the face of a reflective display. Micro scattering features are formed on an outer surface of the light guide, farthest from the reflective display or material. A stepped index layer is formed on the surface of light guide plate containing the micro scattering features. The stepped index layer has an index of refraction lower than an index of refraction of the light guide plate to assist in the total internal reflection of light injected into the light guide plate. The micro scattering features, light reflecting areas, redirect luminous flux toward the display. In one embodiment, the micro scattering features are formed as white dots on the light guide plate. A black absorbing layer can be added to each white scattering dot in order to improve the apparent contrast when the front light is deactivated.

24 Claims, 8 Drawing Sheets

(56) References Cited

U.S. PATENT DOCUMENTS

| | | | |
|---|---|---|---|
| 6,266,108 B1 | 7/2001 | Bao et al. | 349/63 |
| 6,340,999 B1 | 1/2002 | Masuda et al. | |
| 6,379,017 B2 | 4/2002 | Nakabayashi et al. | 362/31 |
| 6,742,907 B2 | 6/2004 | Funamoto et al. | |
| 6,866,393 B2 * | 3/2005 | Yano et al. | 349/63 |
| 6,879,354 B1 | 4/2005 | Sawayama et al. | 349/63 |
| 6,975,455 B1 | 12/2005 | Kotchick et al. | |
| 7,001,606 B2 | 2/2006 | Schmidt et al. | 424/405 |
| 7,108,414 B2 | 9/2006 | McCollum et al. | 362/604 |
| 7,245,335 B2 | 7/2007 | Watanabe | |
| 7,253,809 B2 | 8/2007 | Boyd et al. | 345/176 |
| 7,566,156 B2 | 7/2009 | Hasei et al. | |
| 7,864,395 B2 | 1/2011 | Chui | |
| 2005/0072032 A1 | 4/2005 | McCollum et al. | |
| 2005/0140879 A1 | 6/2005 | Nam | |
| 2008/0013013 A1 | 1/2008 | Kim et al. | |
| 2010/0014027 A1 | 1/2010 | Li et al. | |
| 2010/0157406 A1 | 6/2010 | Gruhlke et al. | |
| 2011/0227487 A1 | 9/2011 | Nichol et al. | |
| 2013/0063969 A1 * | 3/2013 | Neugebauer et al. | 362/603 |

FOREIGN PATENT DOCUMENTS

| | | |
|---|---|---|
| TW | 201109797 A | 3/2011 |
| WO | WO9963394 A1 | 12/1999 |

* cited by examiner

PLANAR FRONT ILLUMINATION SYSTEM HAVING A LIGHT GUIDE WITH MICRO SCATTERING FEATURES FORMED THEREON AND METHOD OF MANUFACTURING THE SAME

CROSS-REFERENCE TO RELATED APPLICATION

This application claims benefit of U.S. Provisional Application No. 61/525,667, filed Aug. 19, 2011, which is hereby incorporated by reference.

FIELD OF THE INVENTION

The present invention generally relates to planar front illumination systems for the illumination of reflective materials and displays, and more particularly to a light guide plate that conducts light from an edge light source across the face of a reflective display.

BACKGROUND OF THE INVENTION

In contrast to backlit displays (e.g., a backlit transmissive Liquid Crystal Display, LCD), where light is projected through one or more filters or shutters to create an observable image, a reflective display (e.g., an electrophoretic display, EPD) relies on light reflected off of a reflective surface to generate an image. Typically, reflective displays make use of the ambient light present in the environment where the display is used. Planar front illumination systems have been used for many years to augment the ambient light so that reflective displays can be used in darker environments. Typical planar front light illumination systems are made of clear materials and are attached to the front of reflective electronic displays. Front lights provide supplemental illumination to the face of the display when the reflected ambient light is insufficient to create an observable image.

An ideal front light illumination system would be able to efficiently and uniformly direct the light from a supplemental light source toward the display while not emitting stray light toward the environment or user. This ideal front light illumination system passes all of the reflected light to the user without optical loss or optical artifacts. Further, such an ideal front illumination system would be unobtrusive under ambient lighting, i.e., maintaining the contrast, brightness and image quality of the underlying display. In addition, such an ideal front light is also low cost, thin, lightweight, easily manufactured, compatible with touch technologies and widely available.

One common type of front light illumination system includes a light guide plate constructed with numerous microscopic optical surface features. Each of these optical surface features incrementally redirects a small portion of the light inside the light guide plate using reflection or refraction. Ideally, these optical surfaces extract and distribute the luminous flux within the light guide plate uniformly over the surface of the reflective display. To achieve reflection or refraction without mirrored surfaces (which would be costly), optical engineers carefully construct the critical features and angles of the micro optical surface features to reliably and predictably reflect or refract a desired amount of light despite the often poor collimation (i.e., the wide distribution of ray angles) of the source illuminators (e.g., LEDs). The refractive and reflective feature of an optical interface is strongly dependent on the relative indices of refraction of the materials on either side of the interface. To maximize the reflective and refractive power of these micro optical features, the micro optical features are usually exposed directly to air to maximize the refractive index difference.

FIG. 1 shows a conventional front illumination system with microscopic optical surface features. This system comprises a reflective display 100, a light source 101 and a light guide plate 102. The light guide plate has optical features 103 formed on the outer facing surface of the front illumination system. The light source 101 is typically comprised of one or more cold cathode fluorescent lights (CCFLs) or one or more LEDs, suitably arranged to produce moderately collimated light 104 directed into a light injection surface of the light guide plate 102.

Common additional features known in the art (not shown) include a reflective housing for the light source 101, surface treatments on the light source 101 and the injection area of the light guide plate 102, and films or mixing plates inserted between the light source 101 and light guide plate 102 that improve coupling efficiency, uniformity, manufacturability, optical performance and cost. Such additions are applicable to the present invention as well to achieve similar advantageous effects.

A substantial portion of the light 104 injected into guide plate 102 remains within the light guide plate 102 due to the well-known optical effect of total internal reflection (TIR). Light guide plate 102 has a plurality of micro optic features 103 on its outer surface that redirect a portion of the guided rays 107 downward at each micro optic feature 103. Ideally, the injected light 104 is uniformly redirected and distributed across the entire surface of the reflective display 100. To achieve uniformity, the density, height, angle, pitch and shape of the micro optic features 103 and the thickness or shape of the light guide plate 102 is modulated across the breadth and width of the light guide plate 102 to account for the diminished light flux as a function of distance from the light source 101.

The incrementally redirected light 107 illuminates the reflective display 100 creating reflected rays 109 that can be seen by a user (the user, not shown, is above the front illumination systems as illustrated herein).

A typical front illumination system is usually only activated when the ambient light 108 falling on the display from external sources is insufficient for the user to perceive an image from the reflective display 100. When ambient illumination 108 is strong enough and consequently the front illumination source is not needed, the front illumination system should be as unobtrusive as possible. Specifically, the front light system should not create unusual reflections, image artifacts or stray light paths that degrade the appearance of the underlying display 100.

FIG. 2 shows a prior art back illumination system comprising a transmissive display 200, a light source 201 and a light guide plate 202. Light guide plate 202 has light extraction dots 203 formed on the outer surface farthest from the display 200. The light source 200 injects light 204 into the light guide plate 202, which is then substantially guided by total internal reflection in a lateral direction in the light guide plate 202. The plurality of light extraction dots 203 is screen or inkjet printed etched, stamped, burned, or molded (among the many conventional methods well known in the art of backlight design) on the outer surface of the light guide plate 202 to act as scattering centers that redirect the guided light 204 in a diffuse scattering pattern 207 towards the transmissive display 200 and ultimately toward the viewer (ray 209). The density, color and/or sizes of the light extraction dots 203 is conventionally varied as a function of position to account for non-uniformity of the light source and to compensate for the consumption of guided light flux as a function of distance from the light source 201. As is known in the art, additional films 208 can be placed between the back light and the transmissive display (e.g. diffusers and light redirecting films, polarizing films, etc.) to improve the optical efficiency and uniformity of the overall display.

The refractive and reflective feature of an optical interface between two clear materials (e.g. plastic and air) is strongly dependent on the relative indices of refraction of the materials on either side of the interface. To optimize the light guiding (via total internal reflection) and light extraction (via scattering, reflection or refraction) behaviors, the micro optical features are usually exposed directly to air to maximize the refractive index difference.

SUMMARY OF THE INVENTION

The front illumination systems of the prior art that rely on air interfaces, while improving the refracting and reflecting effects, create a number of substantial difficulties that are solved by the present invention. First, air gaps between optical elements over a wide area are difficult to mechanically construct while maintaining thinness and optical quality. If the front illumination system is integrated with a touch panel function, the front face must be sufficiently rigid so that it can maintain the air gap under worst case user finger pressure. Air gaps, due to the high relative index of refraction change, also can create substantial unwanted reflections unless costly anti-reflection coatings are used at each interface.

Second, if air gaps are formed on films that are subsequently laminated to a light guide plate (i.e., an embedded air gap), these air gaps are difficult to control in production as the lamination adhesive can be displaced into the air gaps or grooves, modifying the behavior of the light extraction phenomena and creating uniformity problems. An inherent tradeoff in adhesion strength versus optical quality and feature size is introduced that may not provide satisfactory solutions. Furthermore, air pressure and humidity vary widely (sometimes quickly, e.g., on an aircraft) and condensation, contamination and pressure related effects (if sealed) can create engineering, production and user difficulties.

Further, since the source light is usually poorly collimated, stray light leakage can be inadvertently directed toward the viewer, significantly increasing the brightness of the black level and thus degrading contrast. Such stray light leakage, even if not directed to the viewer, e.g., if exported at a highly acute angle from the front surface of the display system, can still result in poor electro-optical efficiency, which can negatively impact the battery life of mobile devices.

Additionally, controlling the quality of the micro optical features created in a molding process can be challenging as the light guide plate is made thinner and lighter.

Another concern associated with the prior art systems is that mechanical damage, e.g., scratches, may extract light from the light guide plate causing them to be especially highlighted when the front light is activated. Additional mechanical barriers between the light guide plate and the user are often required to prevent scratch highlighting, increasing thickness of the front illumination system and degrading optical performance of the display system.

Front light illumination system design forces a number of compromises where optical design goals, e.g. minimizing ambient reflections and image artifacts. are optimized at the expense of some other constraints, e.g., the cost of anti-reflection coatings and thickness of the system.

The front illumination system of the present invention addresses a number of the aforementioned limitations and forced compromises in the art, enabling a fully laminated, thin, light, economical, uniform, mechanically robust, efficient, highly transparent, low artifact, low leakage front illumination system.

The system of the present invention includes a light guide plate that conducts light from one or more edge light sources across the face of a reflective display. Micro scattering features are formed on an outer surface of the light guide farthest from the reflective display or material. These micro scattering features redirect luminous flux from within the light guide toward the display. In one embodiment, the micro scattering features are formed as white dots on the light guide plate. A black absorbing layer can be added to each white scattering dot in order to improve the apparent contrast when the front light is deactivated.

A layer having a lower index of refraction is formed on the surface of the light guide plate having the micro scattering features. This layer is also known as a stepped index layer and assists in substantially confining the injected light in the light guide plate by total internal reflection. This structural configuration provides a fully laminated front illumination system with a buried light guide layer, In addition or in the alternative, the light guide plate can be laminated to the reflective display or other material, or laminated to a top layer protective coat or touch screen, providing a fully laminated front illumination system with a buried light guide layer.

The planar front illumination system of the present invention can be fully laminated with no air gaps, thus maximizing the ruggedness and minimizing the internal surface reflections which can degrade optical performance. The system simplifies integration of reflective displays with touch sensors and is thin and light. The system maximizes the light directed inward toward, for example, a display while minimizing stray light in all other directions. The system generates uniform illumination over a large area while minimizing image and illumination related artifacts such as Moire, ghosting and pressure sensitivity. The system is efficiently and inexpensively produced.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
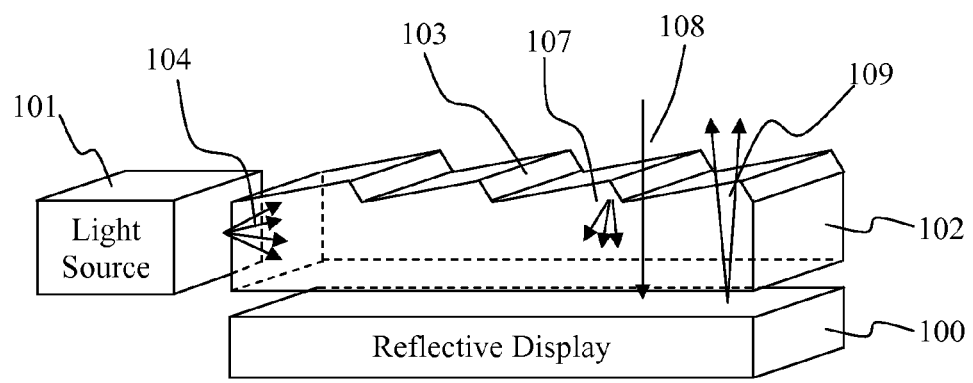
FIG. 1 depicts a prior art front illumination system for a reflective display with micro optic features on the front face of a light guide plate.
Figure 2:
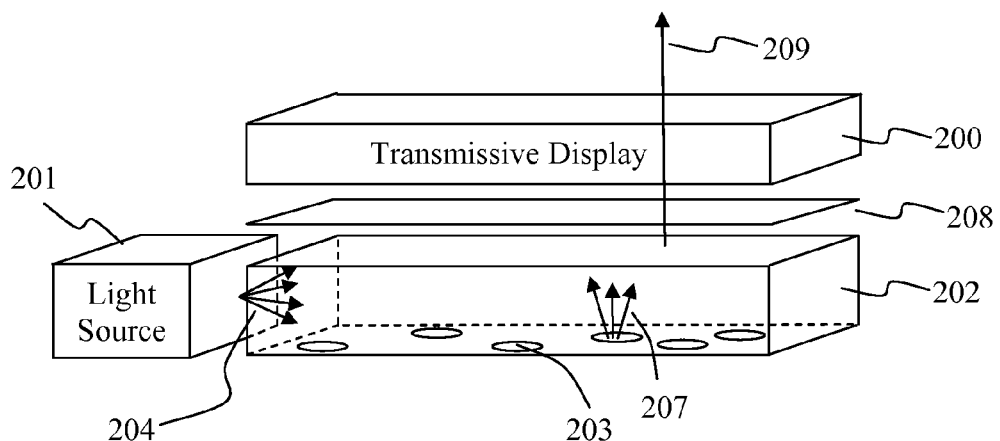
FIG. 2 illustrates a prior art back illumination system for a transmissive display utilizing a printed dot pattern light guide plate.
Figure 3:
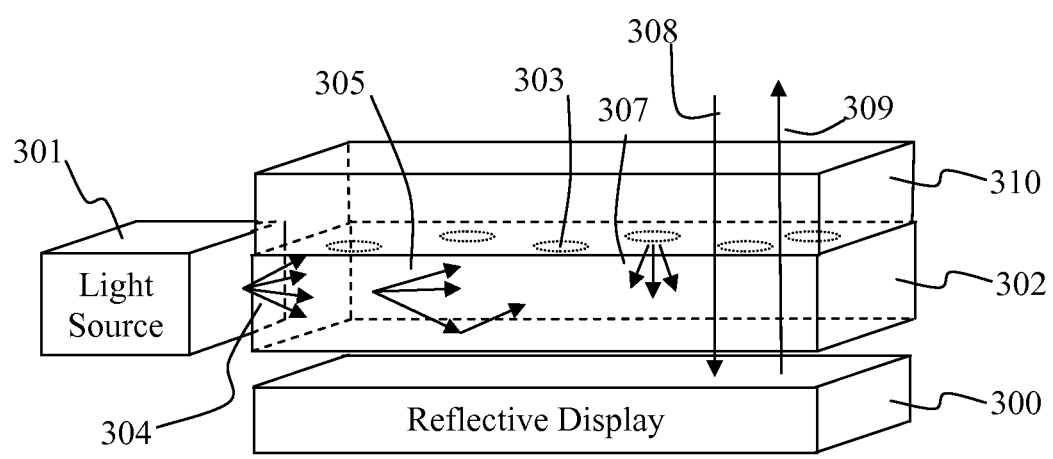
FIG. 3 illustrates a planar front illumination system of the present invention with printed dots formed on the outer face of a light guide plate.

The following abbreviations are utilized in the following description, which are intended to have the meanings provided as follows:
CCFL—cold cathode fluorescent light
EPD—electrophoretic display
LCD—liquid crystal display
LGP—light guide plate
LED—light emitting diode
OCA—optically clear adhesive
OLED—organic light emitting diode
PC—polycarbonate
PET—polyethylene terephthalate
PMMA—poly methyl methacrylate
TIR—total internal reflection FIG. 3 shows an embodiment of the present invention comprising a reflective display or material 300, a light source 301 and a light guide plate 302. A plurality of micro scattering features 303 are formed on the outer surface of the light guide plate 302. In a preferred embodiment, the micro scattering features are formed as white dots. The light source 301 and light guide plate 302 are coupled as is well known in the art to achieve efficient, uniform and reproducible injection of light 304 into the light guide plate 302. As illustrated in this FIG. 3, laterally propagating rays 305 are confined within the light guide plate 302 by, in part, the TIR effect from the inner surface of the light guide plate 302 at the interface to a stepped index layer 310. The stepped index layer has an index of refraction that is lower than that of the light guide plate 302. In a preferred embodiment, the stepped index layer 310 is a clear adhesive layer. Although air can be used as the stepped index layer, it is preferred to use some other material, such as the above described clear adhesive layer.

The term "stepped index" is borrowed from the fiber optic technology and is distinguished from other indexes such as "graded index" fiber which has a smooth index peak that confines a single mode in order to keep propagation speed very uniform). In a fiber structure, a cylindrical inner core of high index material is cladded with a lower index material to achieve TIR for light propagating down the length of the cylinder. In contrast to the use in fiber structures, the present invention uses its stepped index layer to confining light in only one dimension and leave the light to freely propagate freely in the other two dimensions. In a fiber, the light is confined in two dimensions and can freely propagate in only one dimension.

Dots 303 with a white or lightly colored scattering side facing the light guide plate 302 are formed in or on the light guide plate 302. In a preferred embodiment, dots 303 are formed on the surface of light guide plate 302. Dots 303 perform a light extraction function in which the laterally propagating rays 305 are diffusely scattered by the dots 303 as rays 307 and are directed toward the reflective display 300. The reflective display 300 reflects the incoming light 307 and the incident ambient light 308 toward the viewer as rays 309, passing through the clear areas of light guide plate 302 and through the stepped index layer 310.

In one embodiment of the present invention, the density of the scattering dots 303 is preferably kept low enough so that the vast majority (e.g. >95%) of the ambient light rays 308 and display reflections 309 cross unimpeded through the light guide plate 302 without encountering a scattering dot 303. In this manner, the impact of the scattering dots 303 on the ambiently lighted display performance is minimized.

In a further embodiment of the present invention, the area of each scattering dot 303 is kept substantially smaller than the underlying reflective display 300 unit pixel area (not shown) so that the scattering dots 303 do not objectionably obscure the underlying pixels. In a further embodiment, the scattering dots 303 are spaced sufficiently closely together and sufficiently elevated above the display 300 image plane so that the scattered light 307 reaching the display 300 image plane is substantially spatially uniform.

In a further embodiment of the present invention, the scattering dots 303 are constructed so that the spatial density, size and/or reflective properties of the dots 303 are varied across the light guide plate 302 so that the uniformity of the extracted light 307 is controlled and optimized. In addition, or in the alternative, the thickness, shape or composition of the light guide plate 302 is varied to compensate for such non-uniformities.

In another embodiment of the present invention, the scattering dots 303 are composed of a white, lightly colored or reflective bottom material facing the light guide plate 302 and a black, darkly colored, or otherwise light absorbing top material facing the viewer (not shown in FIG. 3). Such bi-color composition, dark outside, light inside, prevents the ambient illumination 308 from scattering directly back to the viewer when it falls directly on a scattering dot 303. In this embodiment, the additional dark top of the scattering dots 303 substantially improves the perceived black level of the display 300, thus providing a high contrast ratio substantially similar to the underlying reflective display's native contrast.

A large number of materials are available to the design engineer for constructing the present invention. Light guides are commonly constructed of PMMA or PC plastic, although any optically clear material, e.g., glass, with a higher index of refraction than the surrounding material, e.g., stepped index layer 310 above the light guide plate 302, and air or vacuum below the light guide plate 302 in FIG. 3, and a substantially flat surface will act as a light guide. Light source 301 can assume many forms. For example a CCFL, an OLED or one or more LED lamps coupled to a light bar or mixing plate may be used as the light source 301. One or more sides of the light guide plate 302 may have injecting surfaces with one or more light sources 301. For simplicity, only one light source 301 is shown in the Figures but as is well known in the art, the number and positions of light sources 301, e.g., one or more edges or corners, can be varied, given system constraints on cost, light uniformity, brightness, mechanical boundaries, form factor, etc. Additionally, other light sources 301, e.g., incandescent lamps, lasers, vacuum fluorescent tubes, could be substituted without limiting the present invention.

The optical interfaces and surfaces of the components of the present invention can be coated, shaped, processed, textured or modified by the inclusion or application of specialized films so as to achieve any number of standard desirable changes in properties, e.g., to improve light confinement, improve light guide injection uniformity, reduce stray reflections, improve light source 301 to light guide plate 302 coupling efficiency, improve light guide plate 302 to reflective display interface, reduce thickness and weight, etc. Such additions and modifications are well known in the art of illumination design and are available at the discretion of the designer to achieve the desired balance between cost, performance, yield, etc.

There are many options available for fabricating scattering dots 303 on the light guide plate 302. In one embodiment, the scattering dots 303 are printed using, for example, an industrial inkjet printer. Such printers can apply small, e.g., 30 to 50 microns or less, white or colored dots 303 precisely, rapidly and inexpensively directly onto the surface of the light guide 302. Such scattering dots 303 can also be laser etched, hot stamped, molded, mechanically embossed, chemically etched or created lithographically.

The exact shape of the scattering dots 303 can be substantially changed within the present teachings. The reflecting areas 303 can be circular, square, rectangular or oval in shape, although other shapes are possible. In addition or in the alternative, the reflecting areas 303 can be formed as scattering lines, segments or traces.

In one embodiment of the present invention, the light guide plate 302 and the stepped index layer 310, e.g., optically clear adhesive layer, can be manufactured as a unit, for later incorporation in the assembly of a completed device having a light source 301 and a display 300.

In a preferred embodiment of the present invention, the light guide plate 302 is fabricated from polycarbonate with an index of refraction of approximately 1.585. In a further preferred embodiment, the stepped layer 310 is made of a low index optical adhesive with an index of refraction of between 1.32 and 1.50. In an alternative embodiment, the light guide plate 302 is fabricated from PMMA with an index of refraction of approximately 1.49 and the stepped layer 310 is made of a low index optical adhesive with an index of refraction of between 1.32 and 1.46. Those skilled in the art will recognize the wide variety of light guide materials and adhesive laminating materials that can be substituted within the general framework of the present teachings to create the conditions for sufficient confinement by TIR within the light guide plate 302.

As further described below with respect to FIG. 10, a protective layer (not shown in FIG. 3) can be formed on top of the stepped index layer 310 and can used as a substrate for integrating a fully laminated touch sensor onto the top of the display system. Such laminated touch sensors are well known in the art, e.g., projected capacitance, surface capacitance, infrared, etc., and the lamination of such a touch sensor as, or in addition to, the top protective layer does not alter or degrade the performance of the system of the present invention.

Figure 4A:
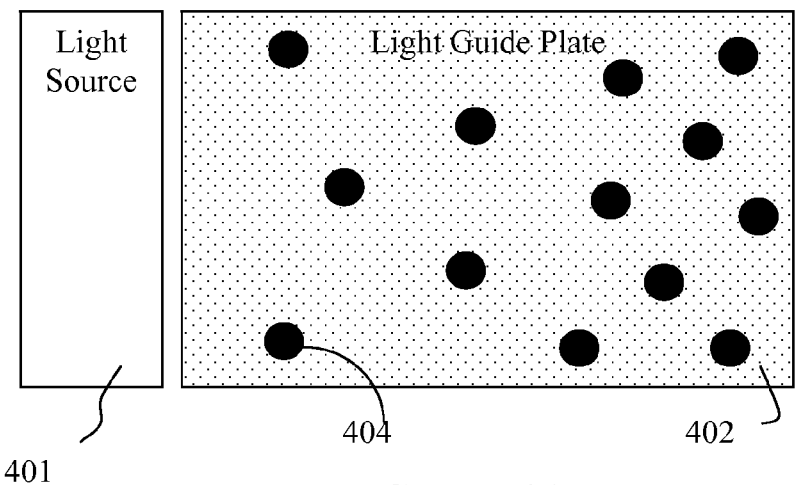
FIG. 4A shows a top view of a planar front illumination system of the present invention with printed dots formed on the outer face of a light guide plate.
Figure 4B:
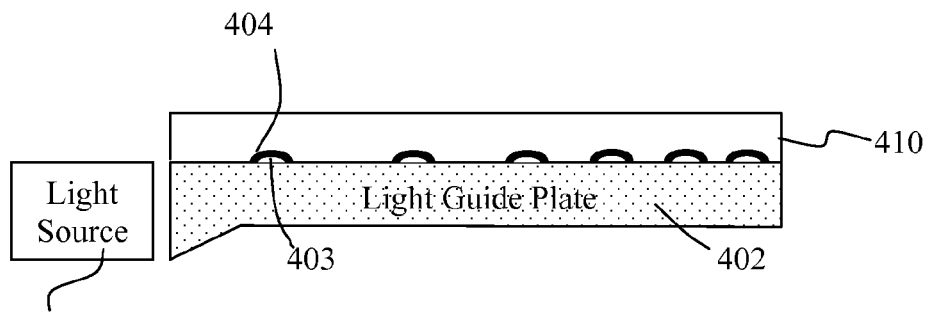
FIG. 4B shows a side view of a planar front illumination system of the present invention.
Figure 4C:
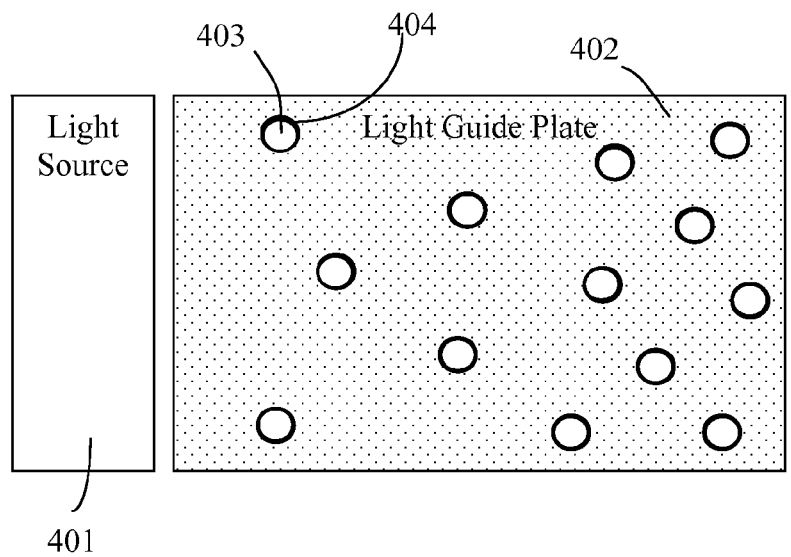
FIG. 4C shows a bottom view of a planar front illumination system of the present invention.

FIGS. 4A, 4B and 4C respectively show top, side and bottom views of a representative embodiment of the present invention. The system includes a light source 401, a light guide plate 402, a stepped index layer 310 and a plurality of white or lightly colored scattering dots 403 formed on the surface of the light guide plate 402. In the embodiment illustrated in FIG. 4, black dots 404 are formed directly on the white scattering dots 403, substantially covering each white dot 403. As described above, one function of the black covering 404 is to absorb direct ambient light (308 in FIG. 3) preventing a direct reflection back to the user by the white dots 403. The reflection of light in the light guide 402 toward the reflecting display is maximized by the white dots 403, while the reflection of ambient light back toward the user is minimized by the black covers 404.

Figure 5:
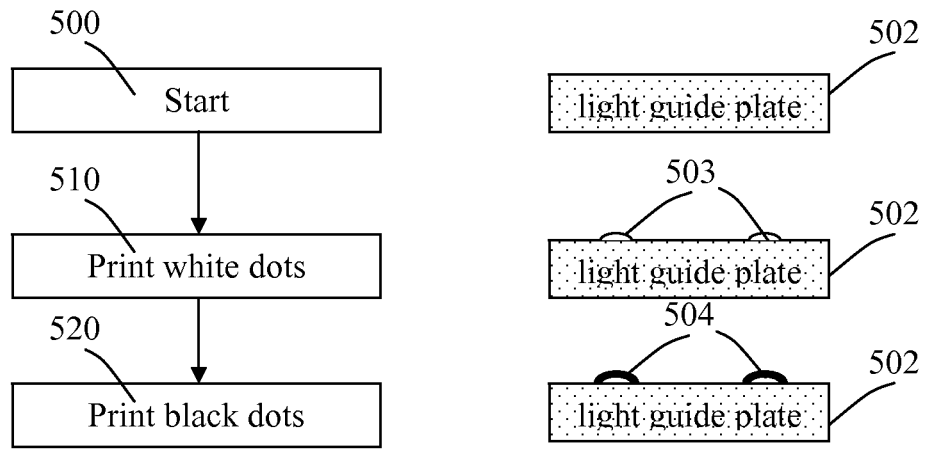
FIG. 5 depicts a flow for a manufacturing process of the present invention using two pass printing.

FIG. 5 shows a representative manufacturing flow of the present invention. In this FIG. 5, and the flowing FIG. 6-9, the process is described in the flow chart on the left of the Figures and the corresponding effect of the manufacturing process on the structure is illustrated on the right. In act 500, the process starts with a bare (blank) light guide plate substrate 502. In act 510, a plurality of white dots 503 is printed onto the light guide plate substrate 502. In an optional third act 520, a plurality of black dots 504 is printed on the surface of the light guide plate 502 substantially aligned on or with the white dots 503.

A wide variety of printing methods, machinery, ink compositions, surface preparations, adhesion promoters, curing options and thermal profiles, etc. are available to the process engineer to achieve the desired balance between cost, throughput, uniformity, yield, etc. Such alternative print or deposition methods are applicable to and within the scope of the present teachings.

Although not shown in FIG. 5, a stepped index layer with an index of refraction lower than that of the light guide plate 502 is preferably applied on top of the light guide plate 502 and dots 504.

Figure 6:
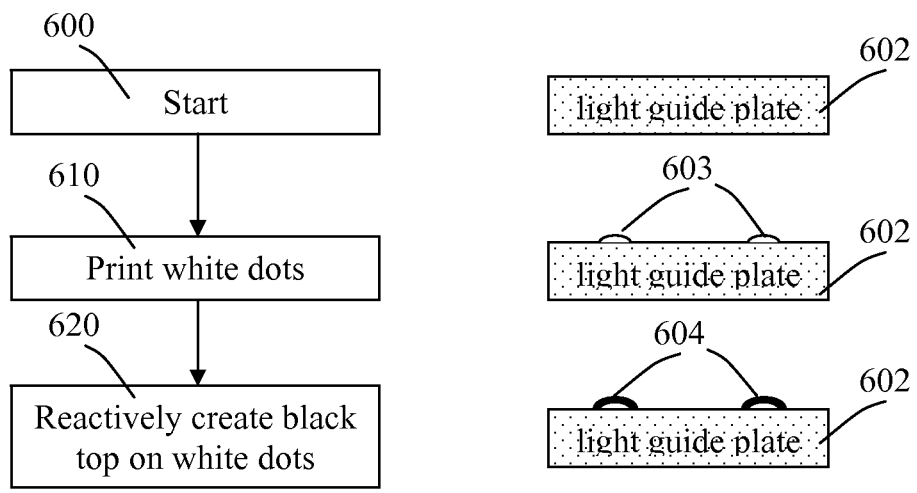
FIG. 6 illustrates a flow for a manufacturing process of the present invention using single pass white dot printing followed by a reactive addition of a black top layer.

FIG. 6 illustrates an alternative manufacturing process of the present invention. In act 600, the process starts with a blank light guide plate substrate 602. In act 610, a plurality of white dots 603 are printed onto the light guide plate 602. In act 620, a black top surface 604 is reactively created on the previously printed white dots 603. Such reactive processing can be a chemically, electrically, thermally or optically activated or mediated process that only affects the exposed area of the white printed ink dots 603. Alternatively, an additive that binds to the surface of the ink drop 603, e.g., a pigment dust or slurry, can be applied to achieve the desired darkened top 604.

Although not shown in FIG. 6, a stepped index layer with an index of refraction lower than that of the light guide plate 602 is preferably applied on top of the light guide plate 602 and dots 604.

Figure 7:
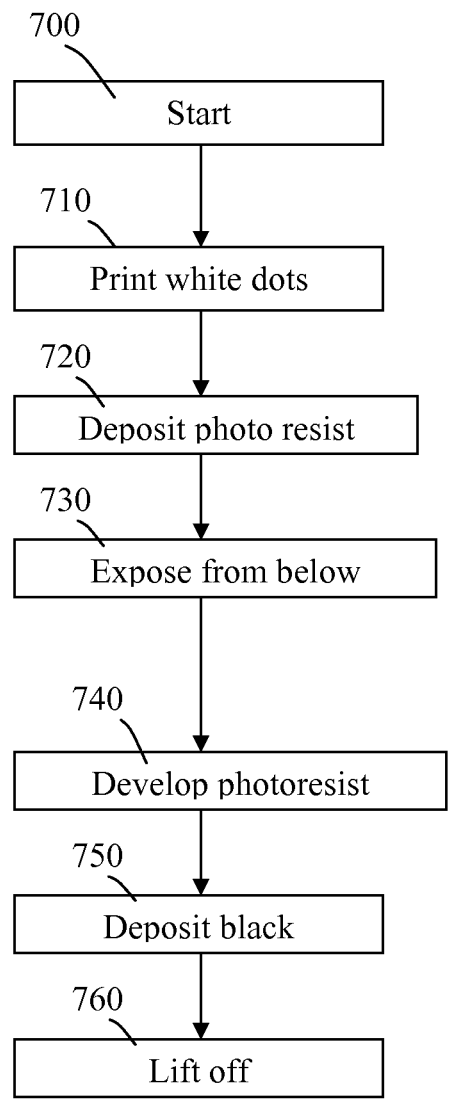
FIG. 7 depicts a flow for a manufacturing process of the present invention using single pass white dot printing followed by a self-aligned lift-off process.
Figure 7:
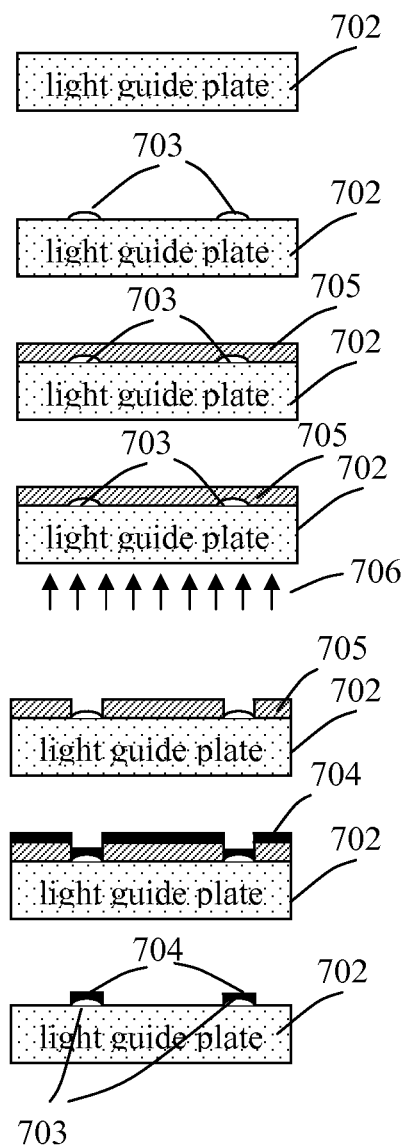

FIG. 7 depicts an alternative manufacturing process of the present invention. As with the previous processes, act 700 starts with a bare light guide plate substrate 702. In act 710 a plurality of white dots 703 are printed on the surface of the light guide 702 using one of the aforementioned printing techniques and inks. In act 720 a negative photoresist 705 is deposited on the substrate 702. Such photoresists 705 are well known in the art, e.g., photoresist AZ5214E. In act 730, the photoresist 705 is exposed 706 from below the light guide plate 702, using the printed dots 703 as an exposure mask. In act 740, the photoresist 705 is developed. In act 750, a black layer 704 is deposited over the photoresist 705 and the printed dots 703. In act 760 the photoresist 705 and the excess black layer 704 on the photoresist 705 is lifted off (stripped) leaving behind white dots 703 with self-aligned black deposits 704 on top of them.

The lift off processing is well known and those skilled in the art can substitute and insert processing steps (e.g., cleaning the substrate, pre-baking the photoresist, etc.) that do not alter the scope of the present teachings. The use of the printed dots 703 as a mask for the photoresist exposure is neither taught or suggested by the prior art. Other processing steps are well known in the art and can be adjusted to achieve a desired cost/yield optimization without loss of generality of the present invention.

Although not shown in FIG. 7, a stepped index layer with an index of refraction lower than that of the light guide plate 702 is preferably applied on top of the light guide plate 702 and dots 704.

Figure 8:
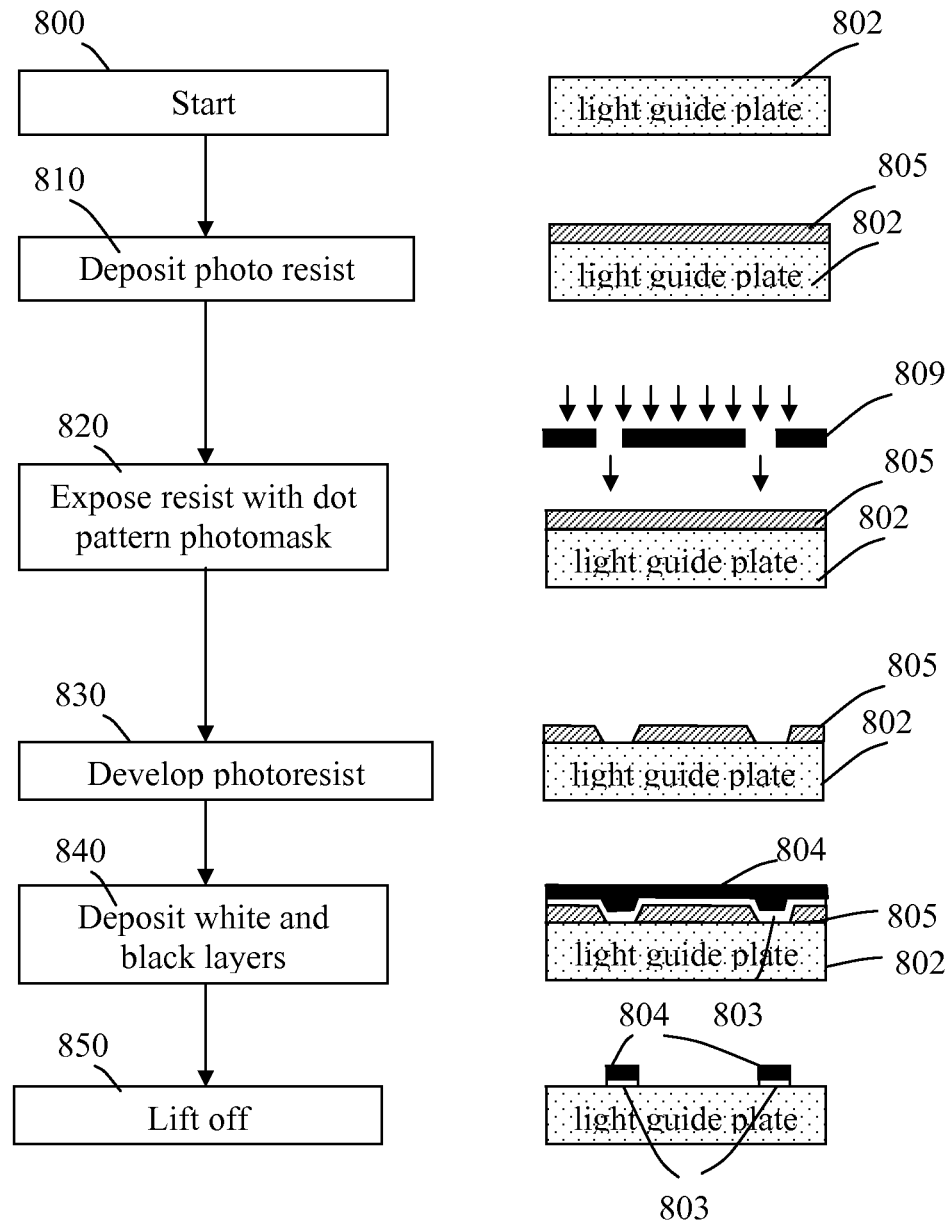
FIG. 8 illustrates a flow for a manufacturing process of the present invention using a photomask and lift-off processing.

FIG. 8 illustrates a further alternative manufacturing process of the present invention. In act 800, the process starts with a bare light guide plate substrate 802. In act 810, a photoresist 805 is deposited on the substrate 802. In act 820 the photoresist 805 is exposed using a lithographic mask 809 that represents the desired dot pattern. In act 830, the photoresist 805 is developed. In act 840, a white 803 and a black layer 804 are sequentially deposited on the photoresist. 805 and substrate 802. In act 850, the photoresist 805 and the non-dot material is lifted off and cleared, leaving the white colored dots 803 with a black covering 804. As appreciated by those skilled the art, the application of the black layer 804 is an optional process.

Although not shown in FIG. 8, a stepped index layer with an index of refraction lower than that of the light guide plate 802 is preferably applied on top of the light guide plate 802 and dots 804.

Figure 9:
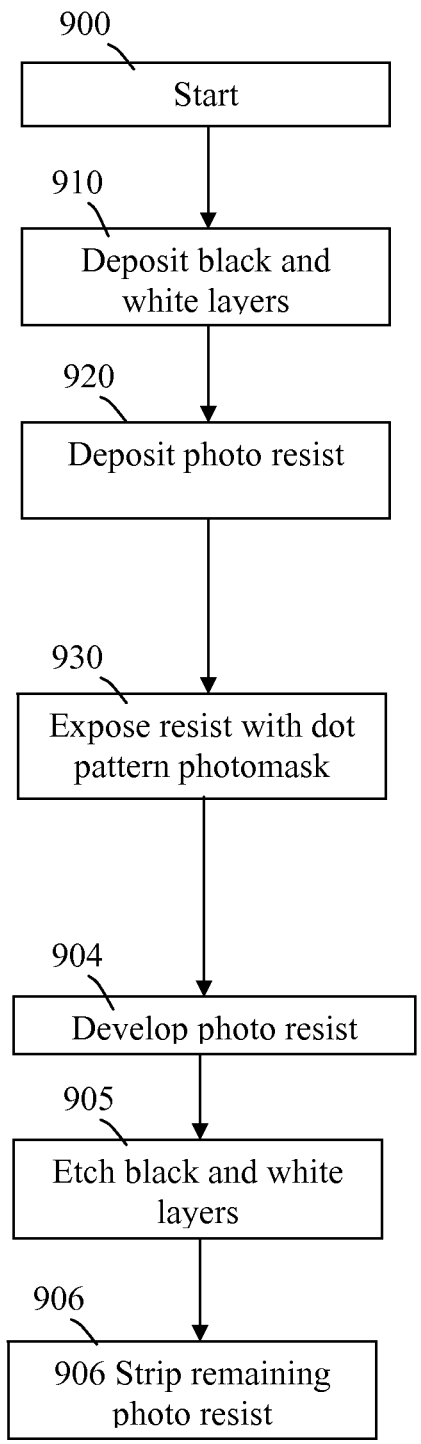
FIG. 9 depicts a flow for a manufacturing process of the present invention using a photomask and etch processing.
Figure 9:
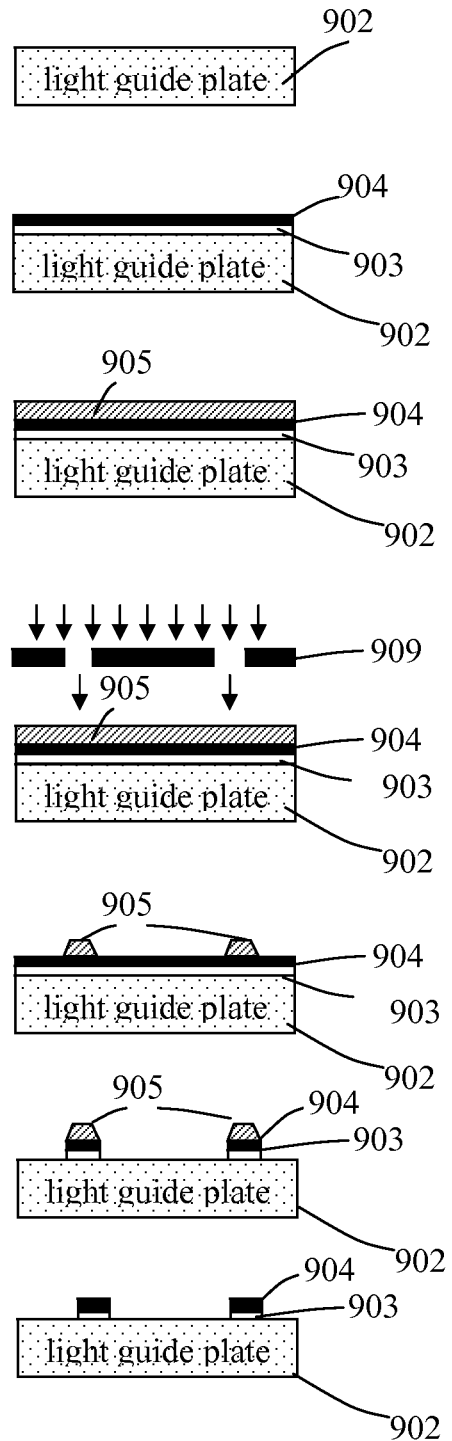

FIG. 9 depicts an alternative manufacturing process of the present invention. In act 900, the process starts with a bare light guide plate substrate 902. In act 910, first a white 903 then a black layer 904 is deposited on the substrate 902. In act 920, a photoresist 905 is deposited on the black layer 904. In act 930, the photoresist 905 is exposed using a lithographic mask 909 representing the desired dot pattern. In act 940 the photoresist 905 is developed. In step 950, the black 904 and white layers 903 are etched and in act 960 the remaining photoresist 905 is stripped, leaving the white colored dots 903 with a black covering 904. As appreciated by those skilled the art, the application of the black layer 904 is an optional process.

Although not shown in FIG. 9, a stepped index layer with an index of refraction lower than that of the light guide plate 902 is preferably applied on top of the light guide plate 902 and dots 904.

The lithographic techniques as described in FIGS. 7, 8 and 9 can be modified to optimize for a variety of constraints, e.g., line throughput, repeatability, cost, etc., by changing or adding processing steps or materials.

Figure 10:
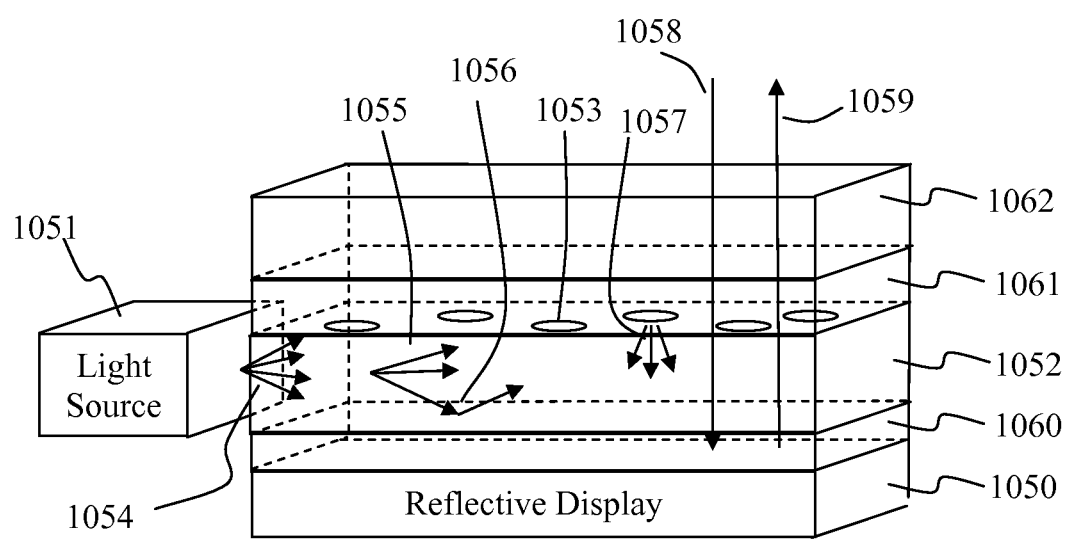
FIG. 10 illustrates a planar front illumination system of the present invention with printed dots formed on the outer face of a light guide plate with additional lamination layers which remove all air gaps and voids.

FIG. 10 shows a further embodiment of the present invention. This embodiment includes a reflective display or material 1050, a light source 1051 and a light guide plate 1052. As with the previous embodiments, a plurality of scattering dots 1053 is formed on the outer surface of the light guide plate 1052. Low index of refraction laminating adhesive layers 1060 and 1061 form a stepped index layer that is used for substantially confining injected 1054 and propagated light 1055 by TIR 1056 within the light guide plate 1052. An additional protective layer 1062 is optionally added to the top of the optical stack.

The light source 1051 and light guide plate 1052 are coupled as is well known in the art to achieve efficient, uniform and reproducible light injection 1054 into the light guide plate 1052. Laterally propagating rays 1055 are confined within the light guide plate by TIR effect 1056. A portion of the confined light 1055 strikes a given scattering dot 1053 which redirects a portion 1057 of the luminous flux toward the reflective display 1050, which is then reflected back through the optical stack 1060, 1052, 1061 and 1062 out toward the viewer as rays 1059. Ambient light 1058 incident on the display 1050 propagates substantially through the optical stack 1060, 1052, 1061 and 1062 with minimum optical losses and distortions to illuminate the display 1050 and create a viewable ray 1059 when ambient light is available.

In a preferred embodiment of the present invention, the light guide plate 1052 is fabricated from polycarbonate with an index of refraction of approximately 1.585. In a further preferred embodiment, the optical adhesive layers 1060 and 1061 are made of a low index optical adhesive with an index of refraction of between 1.32 and 1.50. In an alternative embodiment, the light guide plate 1052 is fabricated from PMMA with an index of refraction of approximately 1.49 and the optical adhesive layers 1060 and 1061 are made of a low index optical adhesive with an index of refraction of between 1.32 and 1.46. Those skilled in the art will recognize the wide variety of light guide materials and adhesive laminating materials that can be substituted within the general framework of the present teachings to create the conditions for sufficient confinement by TIR within the light guide plate 1052.

Protective layer 1062 can be used as a substrate for integrating a fully laminated touch sensor onto the top of the display system. Such laminated touch sensors are well known in the art, e.g., projected capacitance, surface capacitance, infrared, etc., and the lamination of such a touch sensor as, or in addition to, the top protective layer 1062 does not alter or degrade the performance of the system of the present invention.

The system as illustrated in FIG. 10 enables the full lamination of the front illumination system to both the display 1050 and an outer protective sheet 1062 by using micro scattering dots 1053 on the outer surface of the light guide plate 1052 as opposed to prisms, lenses or TIR mirrors as has been described in the prior art. By eliminating the micro optic features used in the prior art for light extraction from the light guide plate 1052, the system as of FIG. 10 can tolerate a reduced refractive index step (between light guide core and optical adhesive layers), while still acceptably confining the injected light 1054. This allows the elimination of air gaps in the device structure and the benefits of thinness, robustness, uniformity and repeatability that ensue.

As described above, the white dots 1053 can additionally be coated with a dark or black pigment. An additional benefit of a two layer dot (black on white) is that any stray light entering the display from above (by stray reflections or external sources) or guided within the optical adhesive 1060 and protective sheet 1062 will encounter absorbing black dots when crossing into the light guide plate 1052 from above and thus will not refract or reflect back to the viewer as often happens with micro optical feature based light extraction systems.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:
1. A front illumination device comprising:
a light source;
a light guide plate optically coupled with the light source;
a reflective display disposed adjacent a first surface of the light guide plate;
a plurality of light scattering areas disposed on a second surface of the light guide plate, the second surface being opposite the first surface;
a stepped index layer disposed on the second surface of the light guide plate, the stepped index layer having an index of refraction lower than an index of refraction of the light guide plate,
wherein the light guide plate is capable of reflecting at least a portion of light injected by the light source toward the reflective display.
2. The front illumination device of claim 1, wherein the light scattering areas are lightly colored, the device further comprising a darkly colored coating disposed on a surface of at least a portion of the light scattering areas opposite the second surface, wherein the darkly colored coating absorbs ambient light.

3. The front illumination device of claim 1, wherein the light guide plate is capable of substantially containing the injected light by total internal reflection.

4. The front illumination device of claim 1, wherein the light scattering areas occupy less than approximately 5% of the area of the second surface of the light guide plate.

5. The front illumination device of claim 1, wherein the light guide plate has an index of refraction of approximately 1.585.

6. The front illumination device of claim 1, wherein each of the light scattering areas has a width of approximately 50 microns or less.

7. The front illumination device of claim 1, wherein at least one of a spatial density, size and reflective properties of the light scattering areas is varied across the second surface of the light guide plate to be capable of controlling the reflected light to achieve substantial uniformity.

8. The front illumination device of claim 1, further comprising:
a first optically clear adhesive layer coupling the reflective display and the first surface of the light guide plate.

9. The front illumination device of claim 8, wherein the first optically clear adhesive layer has an index of refraction between 1.32 and 1.50.

10. The front illumination device of claim 8, wherein the stepped index layer comprises a second optically clear adhesive layer.

11. The front illumination device of claim 10, wherein each of the first and second optically clear adhesive layers has an index of refraction between 1.32 and 1.50 and act as a stepped index layer to assist in substantially confining the injected light in the light guide plate by total internal reflection.

12. The front illumination device of claim 10, further comprising a protective layer disposed on the second optically clear adhesive layer.

13. The front illumination device of claim 12, wherein the protective layer is a touch sensor.

14. The front illumination device of claim 1, wherein the a stepped index layer disposed on the second surface of the light guide plate without any substantial air gaps therebetween.

15. A light guide assembly for a front illumination device comprising:
a light guide plate;
a plurality of light scattering areas disposed on a first surface of the light guide plate; and
a stepped index layer disposed on the first surface of the light guide plate, the stepped index layer having an index of refraction lower than an index of refraction of the light guide plate.

16. A method for manufacturing a front illumination device, the method comprising:
providing a light guide plate;
forming a plurality of light reflecting areas on a first surface of the light guide plate;
forming a stepped index layer on the first surface of the light guide plate, the stepped index layer having an index of refraction lower than an index of refraction of the light guide plate; and
coupling a second surface of the blank light guide plate to a reflective display, the second surface being opposite to the first surface.

17. The method for manufacturing a front illumination device according to claim 16, wherein the act of forming the plurality of light reflecting areas further comprises printing the plurality of light reflecting areas on the first surface of the light guide plate.

18. The method for manufacturing a front illumination device according to claim 17, further comprising printing a darkly colored coating on a top of each of at least a subset of the plurality of the light reflecting areas.

19. The method for manufacturing a front illumination device according to claim 16, further comprising reactively forming a darkly colored coating on a top of each of at least a subset of the plurality of the light reflecting areas.

20. The method for manufacturing a front illumination device according to claim 16, further comprising:
depositing a photoresist on the first surface of the light guide plate and on the plurality of light reflecting areas;
exposing the photoresist using the plurality of light reflecting areas as an exposure mask;
developing the photoresist;
depositing a black layer on the photoresist and the plurality of light reflecting areas; and
lifting off the photoresist, wherein the black layer remains aligned on a top of the plurality of light reflecting areas.

21. A method for manufacturing a light guide for a front illumination device, the method comprising:
providing a light guide plate,
depositing a photoresist on a first surface of the light guide plate;
exposing the photoresist using a mask;
developing the photoresist to expose a plurality of areas on the first surface of the light guide plate;
depositing a layer of lightly colored material on the photoresist and the plurality of areas;
lifting off the photoresist, wherein the lightly colored material creates light reflecting areas in the plurality of areas; and
forming a stepped index layer on the first surface of the light guide plate, the stepped index layer having an index of refraction lower than an index of refraction of the light guide plate.

22. The method for manufacturing a light guide for a front illumination device according to claim 21, further comprising:
depositing a layer of darkly colored material on the layer of lightly colored material, wherein a portion of the layer of darkly colored material remains aligned on top of the light reflecting areas.

23. A method for manufacturing a light guide for a front illumination device, the method comprising:
providing a light guide plate,
depositing a layer of lightly colored material on the light guide plate;
depositing a photoresist on the layer of lightly colored material;
exposing the photoresist using a mask;
developing the photoresist to create a plurality of areas above the layer of lightly colored material;
etching the layer of lightly colored material;
stripping any remaining photoresist, wherein the lightly colored material creates light reflecting areas in the plurality of areas; and
forming a stepped index layer on the light guide plate and the light reflecting areas, the stepped index layer having an index of refraction lower than an index of refraction of the light guide plate.

24. The method for manufacturing a light guide for a front illumination device according to claim 23, further comprising:

depositing a layer of darkly colored material on the layer of lightly colored material, wherein a portion of the layer of darkly colored material remains aligned on top of the light reflecting areas.

* * * * *